United States Patent [19]

Jacob

[11] Patent Number: 5,176,453
[45] Date of Patent: Jan. 5, 1993

[54] BALL CIRCULATING UNIT FOR LINEAR BALL GUIDANCE

[76] Inventor: Werner Jacob, Briandring 29, D-600 Frankfurt/Main, Fed. Rep. of Germany

[21] Appl. No.: 770,622

[22] Filed: Oct. 3, 1991

[30] Foreign Application Priority Data

Oct. 4, 1990 [DE] Fed. Rep. of Germany ....... 4031354

[51] Int. Cl.⁵ ............................................. F16C 29/06
[52] U.S. Cl. .................................................. 384/43
[58] Field of Search ............................. 384/43, 44, 45; 464/168

[56] References Cited

U.S. PATENT DOCUMENTS

| | | | |
|---|---|---|---|
| 4,334,716 | 6/1982 | Magee et al. | 384/43 |
| 4,444,443 | 4/1984 | Teramachi | 384/43 |
| 4,952,075 | 8/1990 | Rogers | 384/43 |
| 5,069,555 | 12/1991 | Mugglestone et al. | 384/43 |

Primary Examiner—Lenard A. Footland
Attorney, Agent, or Firm—Harness, Dickey & Pierce

[57] ABSTRACT

The invention relates to a ball circulating unit (1) for a linear ball guidance device. The ball loops are formed by a multi-component cage (7). The cage (7) consists of groups of first and/or second inner segments (12) and (13). Head pieces (14) and webs (18) assist in guiding the balls (8) in the carrying portions (9) of the ball loops. The cage (7) is able to be produced by injection molding. The design of the inner segments (12, 13) permits variability in design and arrangement of the balls (8).

8 Claims, 3 Drawing Sheets

BALL CIRCULATING UNIT FOR LINEAR BALL GUIDANCE

BACKGROUND AND SUMMARY OF THE INVENTION

The invention relates to a ball circulating unit for a linear ball guidance device. The device is movable along a guiding rail with a circular cross-section. The device at least partially encloses the guiding rail. The device includes several continuous loops of balls, which are distributed across the rail cross-section, and are guided in a cage. The cage includes a plurality of loops, each loop including a carrying portion, in which the balls project radially inwardly from the cage and rest against the guiding rail, a returning portion and deflecting portions which connect the carrying and returning portions at their ends. The carrying portion and returning portion extend parallel to the longitudinal axis. The cage is fixed in the circumferential and axial direction in the basic outer member. The cage generally is a multi-component cage including a plurality of inner segments which act as a guiding means for the carrying portions, returning portions and head pieces, which form the deflecting portions attached to their axial ends. The inner segments include axially extending guiding recesses of the carrying portions and, therebetween, guiding grooves which form one or two returning portions. Also, the head pieces and inner segments are centered relative to each other, in accordance with U.S. patent application Ser. No. 07/505,021, filed Apr. 4, 1990, entitled "Ball Circulation Unit for a Linear Ball Guide," now U.S. Pat. No. 5,051,001 the specification and drawings of which are hereby incorporated by reference.

It is an object of the present invention to provide a cage which is easy to produce and which enables more variation in number and arrangement of the carrying portions further optimizing the device.

In accordance with the invention, the objective is achieved by a cage which is divided into groups of inner segments. Each group includes at least a first and second inner segment, which are of different types, with at least one web arranged between the individual groups. The web has at least one guiding recess for the balls provided in carrying portions associated with the adjoining groups.

By dividing the cage into a number of inner segments and head pieces, it is possible to produce it by simple tooling. This is due to the fact that the joint is positioned in the region of the carrying portions. In consequence, the inner segments and head pieces may easily be produced from plastics by injection molding.

Furthermore, it is advantageous, as a result of arranging the inner segments in groups, to arrange two carrying portions each in the circumferential direction of the guiding rail, with the smallest possible distance therebetween, with the load in these directions being introduced into the guiding rail.

Furthermore, an objective is achieved by the inner segments and/or the webs centered at the head pieces. Thus, either at one end or at both ends of the device, the cage is provided with guiding recesses to guide the balls in the carrying portions. The advantage is that assembly is simplified since the cage with one head piece and all inner segments and webs can be inserted into the basic outer member in a pre-assembled condition.

For a cage partially enclosing a guiding rail, it is proposed to divide one web into two half-webs. Each half-web includes a guiding recess for the balls of each carrying portion adjacent the slot.

The webs preferably extend along the length of the basic outer member; they also secure to and extend above and below the head pieces.

The inner segments are held to the head pieces with axial centering journals engaging correspondingly formed through-bores in the head pieces. However, the inner segments may also be secured by a cap attached to the outer basic member.

From the following detailed description taken in conjunction with the accompanying drawings and subjoined claims, other objects and advantages of the present invention will become apparent to those skilled in the art.

DETAILED DESCRIPTION OF THE DRAWINGS

Preferred embodiments of the invention are illustrated in the drawings wherein

DETAILED DESCRIPTION OF THE PREFERRED EMBODIMENTS

Figure 1:
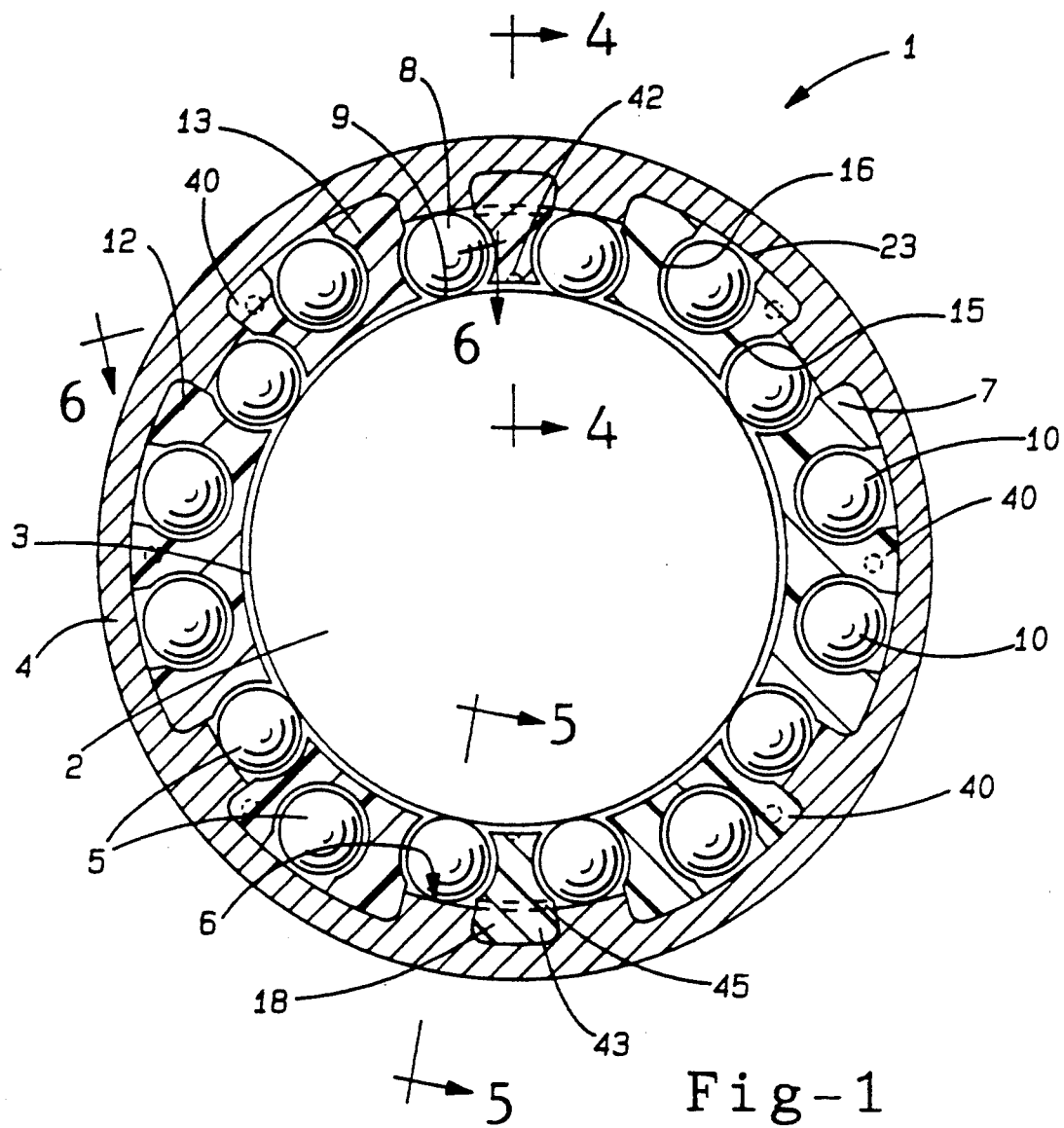
FIG. 1 is a cross section view of a first embodiment of the ball circulating unit in accordance with the present invention.
Figure 2:
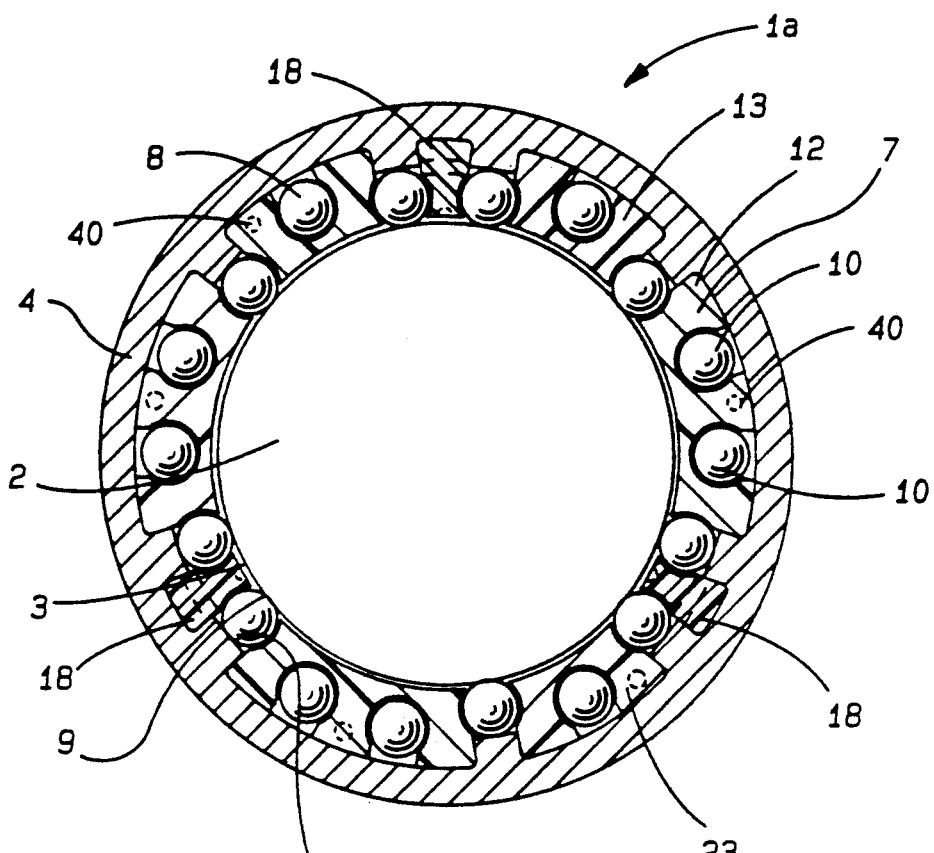
FIG. 2 is a cross section view of a second embodiment in accordance with the present invention.
Figure 6:
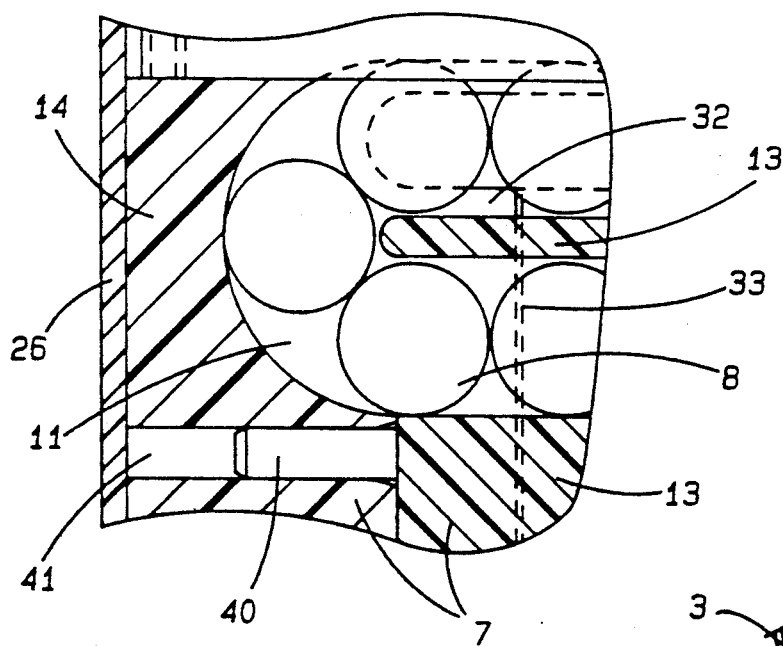
FIG. 6 is a section view along line E-F of FIG. 1.

The ball circulating unit according to FIGS. 1 and 2 includes an outer member 4 with a concentric guiding rail 2. Balls 8 are positioned in ball loops 5 in the cage 7. The balls 8 positioned in the carrying portions 9 of the ball loops 5 are in contact with outer face 3 of the guiding rail 2. In the carrying portion 9, where the balls 8 project radially inwardly from the cage 7, the balls 8 are supported on the outer face 3 of the guiding rail 2 and on the inner running track 6 of the basic outer member 4. The cage loops 5 are each formed by the carrying portions 9, the returning portions 10 and the deflecting portions 11 connecting the two at their ends of the basic outer member 4. As can be seen in FIG. 6, the balls 8 are guided radially outwardly away from the outer face 3 of the guiding rail 2 by the deflecting portions 11. The ball loops 5 each form a continuous path in the cage 7.

In FIG. 1 the cage 7 is formed of two types of inner segments 12 and 13, two head pieces 14 and webs 18. The cage 7 includes a total of four first inner segments 13 and two second inner segments 12. The first inner segments 13 are arranged so as to alternate with the second inner segments 12. The first inner segment 13 includes only one guiding groove 16 which forms the returning portion 10 of the cage loop. The first inner segments 13, in addition, comprise lateral guiding recesses 15 which serve to hold and guide the balls 8 in the carrying portions 9 of the loops 5. Centering journals 40 extend parallel to the guiding axis of the guiding grooves 15 and the longitudinal axis X, respectively, to secure the inner segments 12 and 13 to the head pieces 14.

The second inner segments 12 are positioned between first inner segments 13 as seen in FIG. 1. The second inner segments 12 include two returning grooves 16 forming two ball loops. Also, centering journals 40, which extend parallel to the axis X and the axis of the guiding grooves 16, secure the second inner segments to the head piece 14. At the axial ends of the second inner segments 12, between the guiding grooves 16 and the associated guiding recesses 15, there are arranged semicircular recesses which, together with corresponding recesses in the head pieces 14, form deflecting portions 11 similar to those of FIG. 6.

The first and second inner segments 13 and 12 are received in outer member recesses 23 which extend parallel to the axis X. This positioning establishes a non-rotating connection between the basic outer member 4 and the inner segments 12 and 13. The head pieces 14 are inserted from the end faces of the basic outer member 4. The head pieces 14 and inner segments 12 and 13 are centered relative to each other by a centering projection 32. The centering projection 32 is provided on the head piece 14 and projects into a centering recess 33 in the inner segments 12 and 13. The centering journals 40 of the inner segments 12 and 13, which extend into through-bores 41 of the head pieces 14, act to secure and center the inner segments with respect to the head pieces 14.

Figure 4:
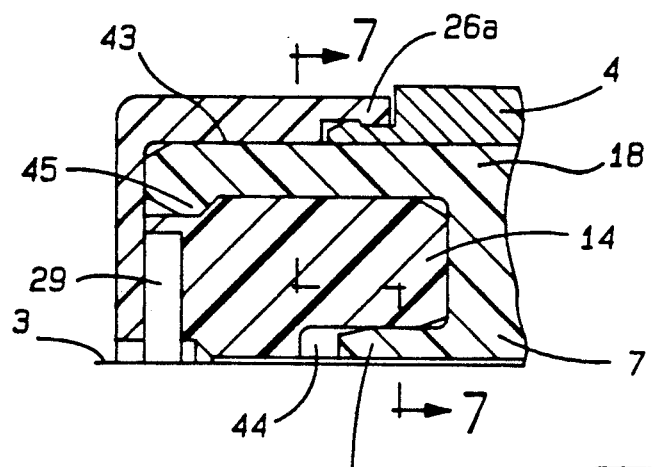
FIG. 4 is a section view along line A-B of FIG. 1, with reference to an end portion.

Webs 18 are provided between two closely adjoining carrying portions 9. The webs 18 extend along the longitudinal axis X approximately along the length of the basic outer member 4. The web end faces abut the head pieces 14 as seen in FIG. 4. On their radially outer faces, the webs 18 are shaped to adapt in the shape of recess 25 on the basic outer member 4. At their sides facing the balls 8 of the carrying portions 9, the webs 18 include guiding recesses 19 which partly embrace the balls 8. Guiding recesses 19 together with the guiding recesses 15 of the circumferentially following inner segments 13, hold the balls 8 and prevent them from falling radially inwardly in the unassembled condition of the ball circulating unit, e.g. when it is not yet fitted on a guiding rail 2. The guiding recesses 19 of the head pieces 14 change into recesses which form a portion of the deflecting portions 11.

Figure 7:
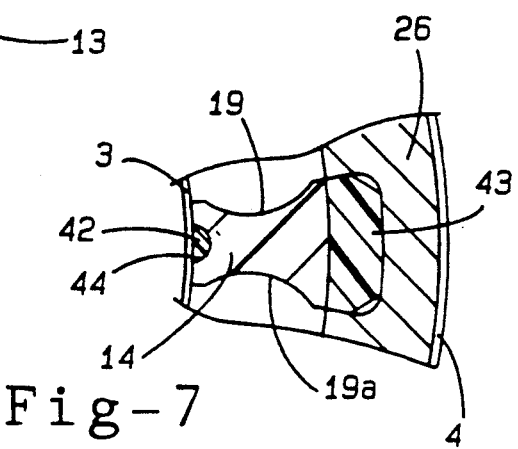
FIG. 7 is a section view along line G-H of FIG. 4.

The webs 18 at their radially outer and inner ends, include centering projections 42 and 43 which extend above and below the head pieces 14 to secure the webs 18 thereto as seen in FIGS. 4 and 7. The centering projection 42 engages an adapted recess 44 of the head piece 14. The outer centering projection 43, by means of a holding protuberance 45, extends over the head piece 14 in a hook-like manner and holds together the assembly consisting of inner segments 12 and 13, webs 18 and head pieces 14.

Figure 5:
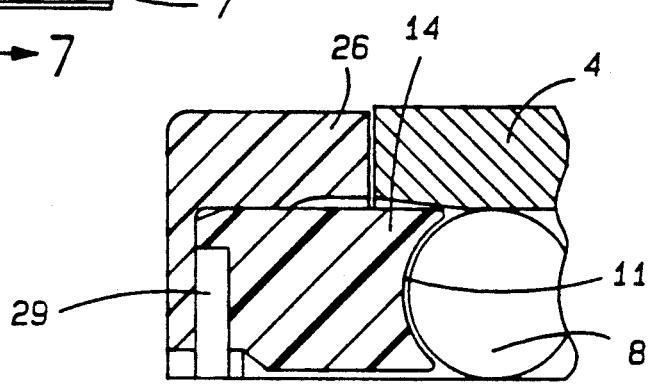
FIG. 5 is a section view along line C-D of FIG. 1, similar to FIG. 4.

It can also be seen that there are two groups of segment assemblies each consisting of a second inner segment 12 and two first inner segments 14 being separated by the two webs 18. The number of webs corresponds to the number of groups formed. The head pieces 14 and webs 18 are covered by caps 26, 26a which are made of sheet metal, for example and are either hooked into the basic member 4 (FIG. 4) or attached to the head pieces 14 and webs 18, with their end edges axially resting against the end faces of the basic outer member 4 (FIG. 5). Between the cap 26 and the return portion of the head piece 14 a recess 29 is formed to position a seal.

In the ball circulating unit 1a according to FIG. 2, three groups of inner segments 12 and 13 are arranged in the basic outer member 4. The three groups each consist of a first and a second inner segment 12 and 13. A web is provided between the closely adjoining carrying portions 9 of two groups following each other in the circumferential direction. The webs are designed as described in connection with FIG. 1. The only difference is there are three groups and thus three webs 18 instead of two as seen in FIG. 1.

Figure 3:
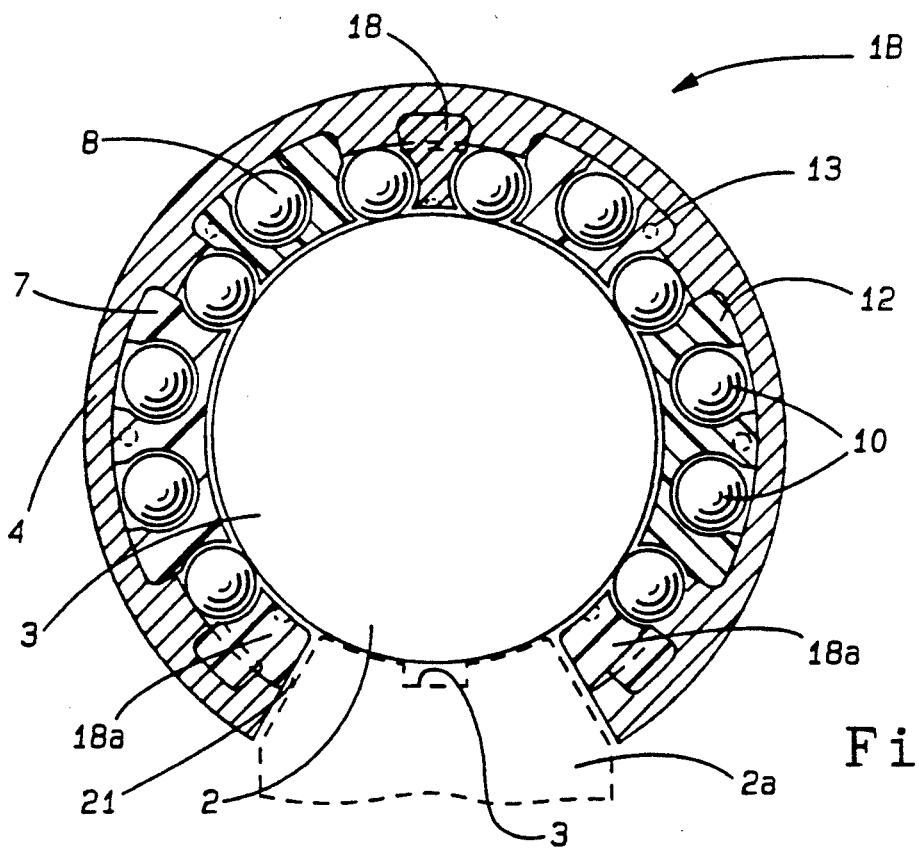
FIG. 3 is a cross section view of a third embodiment in accordance with the present invention.

FIG. 3 shows an alternative design of a ball circulating unit 1b. It comprises a basic outer member 4 with a slot 21. Thus, the guiding rail 2 is only partially embraced. The guiding rail 2 is attached to a fixing element 2a which, in turn, may be attached to a support. There is a total of only six ball loops. There are two first inner segments 13 and two second inner segments 12 which are designed as described in connection with FIG. 1. The groups include one first and one second inner segment 12 and 13 each. There is provided a web 18 between the carrying portions 9 of the closely arranged upper ball loops in accordance with the design as illustrated in FIG. 1. However, two half-webs 18a each comprising only one guiding recess 19a are arranged towards the slot 21 of the basic outer member 4. Thus, the second web is divided into two half-webs 18a. In respect of their connection to the head pieces, the half-webs 18a correspond to the webs 18 according to FIG. 1.

While the above detailed description describes the preferred embodiment of the present invention, the invention is susceptible to modification, variation, and alteration without deviating from the scope and fair meaning of the subjoined claims.

What is claimed is:

1. A ball circulating unit for a linear ball guidance device comprising:
    a cylindrical outer member;
    a cylindrical guiding rail concentrically positioned within said outer member;
    a multi-component cage member circumferentially positioned between said outer member and said guiding rail for providing movement between the two, said multi-component cage including a plurality of groups of inner segments, each of said groups including at least a first and second inner segment, and head pieces at ends of said first and second inner segments, a plurality of loops which include a plurality of balls are associated with said first and second segments and said head pieces, said loops having a carrying portion in which said balls project radially inwardly from said segments and rest against said guiding rail, said inner segments including a guide recess for said balls, a return portion with guide recesses for said balls and a deflecting portion, said return and carrying portions extending parallel to the longitudinal axis with deflecting portions connecting the two enabling the balls to continuously move about said loop in and out of contact with said guiding rail; and
    at least one web positioned between adjacent groups, said web including at least one guide recess such that said web forms part of said carrying portion between adjacent groups.

2. A ball circulating unit according to claim 1, wherein said webs include projection means for securing to said head pieces, said projection means extends above and below said head pieces.

3. A ball circulating unit according to claim 1, wherein said cage includes a slot partially enclosing a portion of said guiding rail, and a pair of webs each comprising a single guiding recess for said balls of each carrying portion adjoining the slot.

4. A ball circulating unit according to claim 1, wherein said first and second inner segments are provided with centering journals engaging through-bores in said head pieces.

5. A ball circulating unit for a linear ball guidance device comprising:
   a cylindrical outer member;
   a cylindrical guiding rail concentrically positioned within said outer member;
   a multi-component cage member circumferentially positioned between said outer member and said guiding rail for providing movement between the two, said multi-component cage including a plurality of inner segment and head pieces at ends of said inner segments, a plurality of loops which include a plurality of balls are associated with said inner segments and said head pieces, said loops having a carrying portion in which said balls project radially inwardly from said segments and rest against said guiding rail, said inner segments including a guide recess for said balls, a return portion with guide recesses for said balls and a deflecting portion, said return and carrying portions extending parallel to the longitudinal axis with said deflecting portions connecting the two enabling the balls to continuously move about said loop in and out of contact with said guiding rail; and
   at least one web positioned between at least one adjacent pair of segments, said web including at least one guide recess such that said web forms part of said carrying portion between said web and said inner segments.

6. A ball circulating unit according to claim 5, wherein said cage includes a slot partially enclosing a portion of said guiding rail, and a pair of webs each comprising a single guiding recess for said balls of each carrying portion adjoining the slot.

7. A ball circulating unit according to claim 5, wherein said first and second inner segments are provided with centering journals engaging through-bores in said head pieces.

8. A ball circulating unit according to claim 5, wherein said webs include projection means for securing to said head pieces, said projection means extends above and below said head pieces.

* * * * *